United States Patent
Chen et al.

(10) Patent No.: US 11,089,184 B2
(45) Date of Patent: Aug. 10, 2021

(54) SYNCHRONOUS MODULATION METHOD BASED ON EMBEDDED PLAYER

(71) Applicant: AMLOGIC (SHANGHAI) CO., LTD., Shanghai (CN)

(72) Inventors: Yunmin Chen, Shanghai (CN); Ting Yao, Shanghai (CN); Zhi Zhou, Shanghai (CN); Lifeng Cao, Shanghai (CN); Zhiheng Cao, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/742,216

(22) Filed: Jan. 14, 2020

(65) Prior Publication Data
US 2020/0228683 A1   Jul. 16, 2020

(30) Foreign Application Priority Data
Jan. 15, 2019   (CN) .......................... 201910036917.X

(51) Int. Cl.
*H04N 5/05* (2006.01)
*H04N 21/43* (2011.01)
*H04N 21/6587* (2011.01)
*H04N 21/845* (2011.01)

(52) U.S. Cl.
CPC ........... *H04N 5/05* (2013.01); *H04N 21/4307* (2013.01); *H04N 21/6587* (2013.01); *H04N 21/8456* (2013.01)

(58) Field of Classification Search
CPC .. H04N 21/8456; H04N 5/05; H04N 21/6587; H04N 21/4307; H04N 21/8547; G11B 27/10

USPC ........................................................ 386/201
See application file for complete search history.

(56) References Cited

U.S. PATENT DOCUMENTS

| 8,699,862 | B1* | 4/2014 | Sharifi | G11B 27/10 386/338 |
|---|---|---|---|---|
| 2009/0168903 | A1* | 7/2009 | Vaquero | H04N 21/4307 375/240.28 |
| 2014/0173430 | A1* | 6/2014 | Clavel | G06F 3/0481 715/716 |
| 2014/0270680 | A1* | 9/2014 | Bloch | H04N 21/8547 386/201 |
| 2019/0364346 | A1* | 11/2019 | Gupta | H04N 21/4307 |

FOREIGN PATENT DOCUMENTS

| CN | 101984672 A | 3/2011 |
|---|---|---|
| CN | 106550248 A | 3/2017 |

* cited by examiner

*Primary Examiner* — Loi H Tran
(74) *Attorney, Agent, or Firm* — Seed Intellectual Property Law Group LLP

(57) ABSTRACT

A synchronous modulation method based on an embedded player. The method comprises the steps of: Step S1, acquiring a current timestamp adopted by a current synchronous audio signal and a current synchronous video signal; Step S2, acquiring a jump difference value of the current timestamp; Step S3, determining whether the jump difference value is less than a first preset time, if yes, synchronously playing, by the player, the audio signal and the video signal through a first timestamp, and exiting; and Step S4, determining whether the jump difference value is greater than a second preset time, if yes, synchronously playing, by the player, the audio signal and the video signal through a second timestamp, and exiting.

14 Claims, 3 Drawing Sheets

SYNCHRONOUS MODULATION METHOD BASED ON EMBEDDED PLAYER

CROSS-REFERENCE TO RELATED APPLICATIONS

The present application claims priority to and the benefit of Chinese Patent Application No. CN 201910036917.X, filed on Jan. 15, 2019, the entire content of which is incorporated herein by reference.

BACKGROUND

Technical Field

The disclosure relates to the technical field of computers, and more particularly, to a synchronous modulation method based on an embedded player.

Description of the Related Art

For an embedded player, an audio and video synchronization is achieved by using a timestamp, and normal audio timestamp information and normal video timestamp information are recorded in a video packaging portion. The timestamp of the embedded player increases linearly. When the timestamp of the embedded player is normal time, in most cases, a third-party reference clock in a linear increase mode acts as a reference clock to compare to the audio timestamp and video timestamp, so that the audio and video synchronization is completed.

At present, the problem with the method is that there are all kinds of video packaging formats, audio and video coding at an acquisition end is compositely packaged. In some cases, it may cause the composite audio timestamp and video timestamp to hop. In particular, the timestamp of the audio and video hops backward or forward, or only one path of the timestamp hops; when a third-party reference clock increasing linearly acts as a synchronization reference clock, timestamp hopping may lead to the following events, that is, the video may be jammed or fast forwarded, or audio and video are not synchronized.

An improved solution for solving the above-mentioned technical problems is not provided.

BRIEF SUMMARY

Given that the foregoing problems exist in the prior art, the present disclosure provides a synchronous modulation method based on an embedded player.

The technical solution is as follows:
Step S1, acquiring a current timestamp adopted by a current synchronous audio signal and a current synchronous video signal;
Step S2, acquiring a jump difference value of the current timestamp;
Step S3, determining whether the jump difference value is less than a first preset time, if yes, synchronously playing, by the player, the audio signal and the video signal through a first timestamp, and exiting; and
Step S4, determining whether the jump difference value is greater than a second preset time, if yes, synchronously playing, by the player, the audio signal and the video signal through a second timestamp, and exiting.

Preferably, wherein the first timestamp is an audio timestamp corresponding to the audio signal; the second timestamp is a video timestamp corresponding to the video signal.

Preferably, wherein
in Step S3, a type of the current timestamp is saved before exiting; and
in Step S4, a type of the current timestamp is saved before exiting.

Preferably, wherein Step S2 further comprises:
detecting whether the current timestamp is the first timestamp;
if yes, comparing the first timestamp to the second timestamp to acquire the jump difference value;
if no, comparing the current timestamp to a timestamp corresponding to the saved type of the current timestamp, to acquire the jump difference value.

Preferably, the method further comprises:
Step S5, when it is determined that the jump difference value is less than the second preset time but is greater than the first preset time, the player uses the second timestamp as the current timestamp to synchronously play the audio signal and the video signal, and waits for a retest.

Preferably, the method further comprises:
Step S6, determining whether the current timestamp is changed to the first timestamp;
if no, then executing Step S7;
if yes, then exiting;
Step S7, detecting whether a wait time reaches a third preset time;
if yes, then returning to Step S1;
if no, then returning to Step S6.

Preferably, wherein in Step S6, the synchronous modulation method performed by another process changes the current timestamp.

Preferably, wherein the first preset time is in a range of 2 s to 7 s.

Preferably, wherein the second preset time is in a range of 40 s to 80 s.

Preferably, wherein the third preset time is in a range of 10 s to 30 s.

By adopting the above-mentioned technical solution, the present disclosure has the beneficial effects that a synchronous modulation method based on an embedded player is provided, instead of using a third-party reference clock increasing linearly as a synchronization reference clock in the prior art, the synchronous modulation method according to the present disclosure uses two different timestamps. When the player plays a video, the synchronization mode is dynamically switched according to a time difference of the two timestamps, so that the problem of video playing abnormalities caused by the timestamp hopping is effectively solved, the player is allowed to continue playing the video, the fault tolerance of the player is further improved, the user experience is improved, and the player is adapted to different types of streaming media servers.

In accordance with another aspect of the present disclosure, a synchronous modulation method for use with an embedded audio and video player is provided. The method includes determining a current timestamp associated with a current synchronous audio signal and a current synchronous video signal, determining a jump difference value of the current timestamp, determining whether the jump difference value is less than a first preset time, and in response to the jump difference value being less than a first present time, synchronously playing, by the embedded video player the audio signal and the video signal through a first timestamp, and exiting, and determining whether the jump difference value is greater than a second preset time, and in response to the jump difference being greater than a second present time, synchronously playing by the embedded video player the audio signal and the video signal through a second timestamp, and exiting.

In accordance with a further aspect of the present disclosure, the first timestamp is an audio timestamp corresponding to the audio signal, and the second timestamp is a video timestamp corresponding to the video signal.

In accordance with still yet another aspect of the present disclosure, in determining whether the jump difference value is less than a first preset time, a type of the current timestamp is saved before exiting, and in the step of determining whether the jump difference value is greater than a second preset time, a type of the current timestamp is saved before exiting.

In accordance with another aspect of the present disclosure, determining a jump difference value of the current timestamp further includes detecting whether the current timestamp is the first timestamp, and in response to the current timestamp being the first time stamp, comparing the first timestamp to the second timestamp to acquire the jump difference value, and in response to the current timestamp not being the first time stamp, comparing the current timestamp to a timestamp corresponding to the saved type of the current timestamp, to acquire the jump difference value.

In accordance with yet another aspect of the present disclosure, the method further includes, after determining whether the jump difference value is greater than a second preset time, determining whether the jump difference value is less than the second preset time but is greater than the first preset time, and in response to the determining whether the jump difference value is less than the second preset time but is greater than the first preset time, the embedded video player uses the second timestamp as the current timestamp to synchronously play the audio signal and the video signal, and waits for a retest.

In accordance with a further aspect of the present disclosure, after determining whether the jump difference value is less than the second preset time but is greater than the first preset time, determining whether the current timestamp is changed to the first timestamp, and in response to determining the current timestamp is changed to the first time stamp, exiting, and in response to determining the current time stamp is not changed to the first time stamp, then detecting whether a wait time reaches a third preset time, and in response to detecting that the wait time has reached a third present time, returning to the initial step of determining a current timestamp associated with a current synchronous audio signal and a current synchronous video signal, and otherwise returning to determining whether the current timestamp is changed to the first timestamp.

BRIEF DESCRIPTION OF THE SEVERAL VIEWS OF THE DRAWINGS

The accompanying drawings, together with the specification, illustrate exemplary implementations of the present disclosure, and, together with the description, serve to explain the principles of the present disclosure.

DETAILED DESCRIPTION

Figure 1:
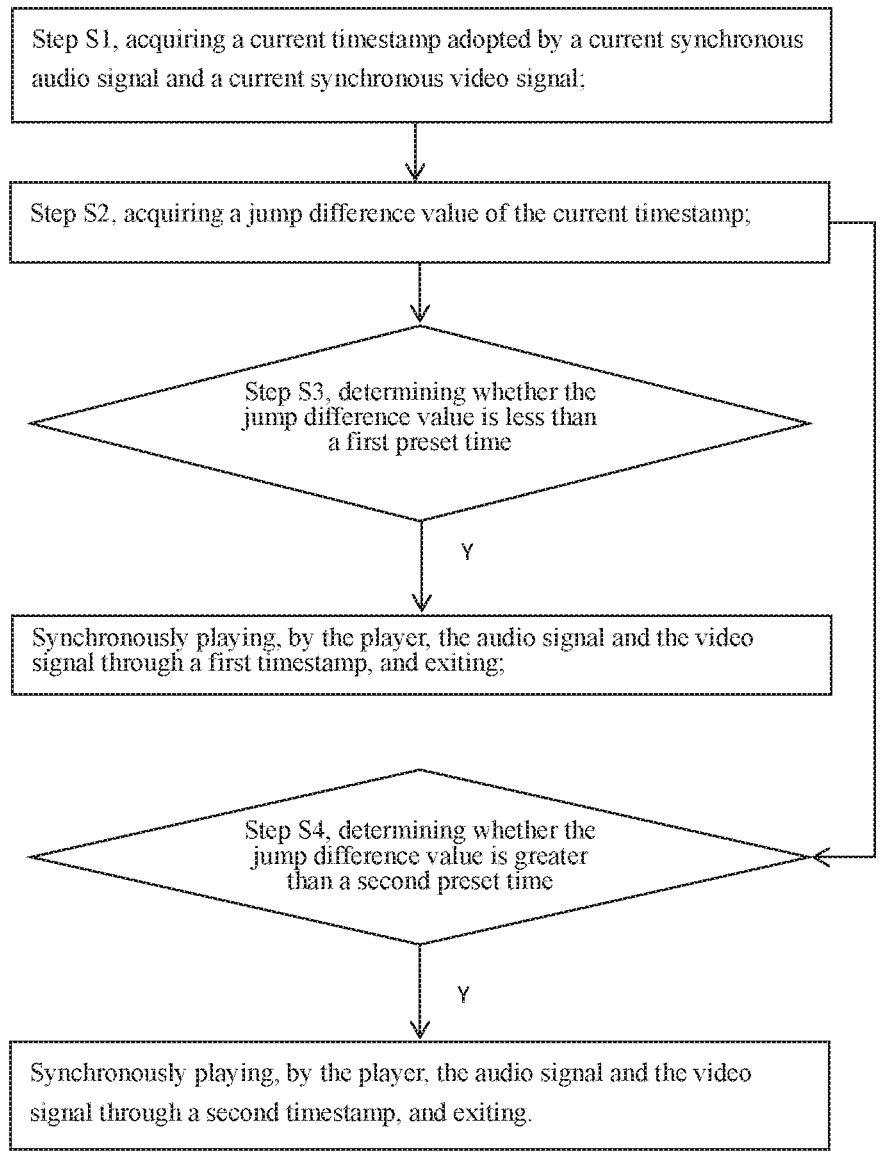
FIG. 1 is a flowchart illustrating steps of a synchronous modulation method based on an embedded player according to an implementation of the present disclosure.

The present disclosure will now be described more fully hereinafter with reference to the accompanying drawings, in which exemplary implementations of the disclosure are shown. This disclosure may, however, be embodied in many different forms and should not be construed as limited to the implementations set forth herein. Rather, these implementations are provided so that this disclosure will be thorough and complete, and will fully convey the scope of the disclosure to those skilled in the art. Like reference numerals refer to like elements throughout.

The terminology used herein is for the purpose of describing particular implementations only and is not intended to be limiting of the disclosure. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the term "plurality" means a number greater than one.

Hereinafter, certain exemplary implementations according to the present disclosure will be described with reference to the accompanying drawings.

At present, the issue is that there are all kinds of video packaging formats, audio coding and video coding at an acquisition end are compositely packaged. In some cases, it may cause the composite audio and video timestamp to hop. In particular, the audio and video timestamp hops backward or forward, or only one path of the timestamp hops; when a third-party reference clock increasing linearly acts as a synchronization reference, timestamp hopping may lead to the following events, that is, the video may be jammed or fast forwarded, or audio and video are not synchronized.

Given that the foregoing problems exist, the present disclosure provides a synchronous modulation method based on an embedded player, as shown in FIGS. 1-4, the method includes:

Step S1, acquiring a current timestamp adopted by a current synchronous audio signal and a current synchronous video signal;

Step S2, acquiring a jump difference value of the current timestamp;

Step S3, determining whether the jump difference value is less than a first preset time, if yes, synchronously playing, by the player, the audio signal and the video signal through a first timestamp, and exiting; and Step S4, determining whether the jump difference value is greater than a second preset time, if yes, synchronously playing, by the player, the audio signal and the video signal through a second timestamp, and exiting.

The above-mentioned synchronous modulation method based on an embedded player, as shown in FIGS. 1-4, is applied to a synchronization modulation process after the timestamp of the audio and video hops. Instead of using a third-party reference clock increasing linearly as a synchronization reference in the prior art, the synchronous modulation method according to the present disclosure uses two different timestamps, that is, a first timestamp and a second timestamp. When the player plays a video, the synchronization mode is dynamically switched according to a time difference of the two timestamps, so that the problem of video playing abnormalities caused by the timestamp hopping is effectively solved.

Specifically, first of all, acquiring a current timestamp adopted by a current synchronous audio signal and a current synchronous video signal. The current timestamp is any one of the first timestamp and the second timestamp, depending on the situation to which the technical solution is applied. When the player is initially playing, one of the first timestamp and the second timestamp may be selected as a default timestamp. For example, the first timestamp may be selected as a timestamp for synchronization of the audio signal and the video signal by default. Next, a jump difference value of the current timestamp is acquired. Then it is determined whether the jump difference value is less than a first preset time. When it is determined that the jump difference value is less than the first preset time, the player synchronously plays the audio signal and the video signal through the first timestamp.

In the above-mentioned technical solution, when the jump difference value of the current timestamp is less than the first preset time, it indicates that the current timestamp does not jump dramatically. Therefore, it is believed that the synchronization of the current audio signal and the current video signal is acceptable. The audio signal and the video signal are synchronized by using the first timestamp. When the first timestamp is selected as a timestamp for synchronization of the audio signal and the video signal by default, it means that when the jump difference value of the current timestamp is less than the first preset time, the audio signal and the video signal are synchronized by using the default timestamp.

Furthermore, it is determined whether the jump difference value is greater than a second preset time. When it is determined that the jump difference value is greater than the second preset time, the player synchronously plays the audio signal and the video signal through a second timestamp.

When the jump difference value is greater than the second preset time, it indicates that the current timestamp hops dramatically. Therefore, it is believed that the synchronization of the current audio signal and the current video signal is not acceptable. The audio signal and the video signal are synchronized by using the second timestamp. When the first timestamp is selected as a timestamp for synchronization of the audio signal and the video signal by default, it means that when the jump difference value of the current timestamp is greater than the second preset time, the audio signal and the video signal are synchronized by using a timestamp different from the default timestamp.

The first preset time is in a range of 2 s to 7 s. Preferably, the first preset time may be 2 s, 3 s, 4 s, 5 s, 6 s, or 7 s.

The second preset time is in a range of 40 s to 80 s. Preferably, the second preset time may be 40 s, 45 s, 50 s, 60 s, 65 s, 70 s, 75 s, or 80 s.

Furthermore, by using the above-mentioned synchronous modulation method, after the timestamp of the player jumps, the video continues playing as expected, and the audio and video may play synchronously; then video jamming and fast forward and slow forward may be further avoided; in particular for live streaming, the normal playback of the live streaming is not affected, the fault tolerance of the player is further improved, the user experience is improved, and the player is adapted to different types of streaming media servers.

As a preferred implementation, the first timestamp is an audio timestamp corresponding to the audio signal; the second timestamp is a video timestamp corresponding to the video signal.

Based on the above-mentioned technical solution, in Step S3, a type of the current timestamp is saved before exiting; and in Step S4, a type of the current timestamp is saved before exiting.

For the above-mentioned technical solution, after the timestamp of the player for the synchronization of the audio signal and the video signal is selected, the previous timestamp configured to synchronize the audio signal and the video signal is saved, that is, the current timestamp obtained in Step S1 is saved before exiting.

Figure 2:
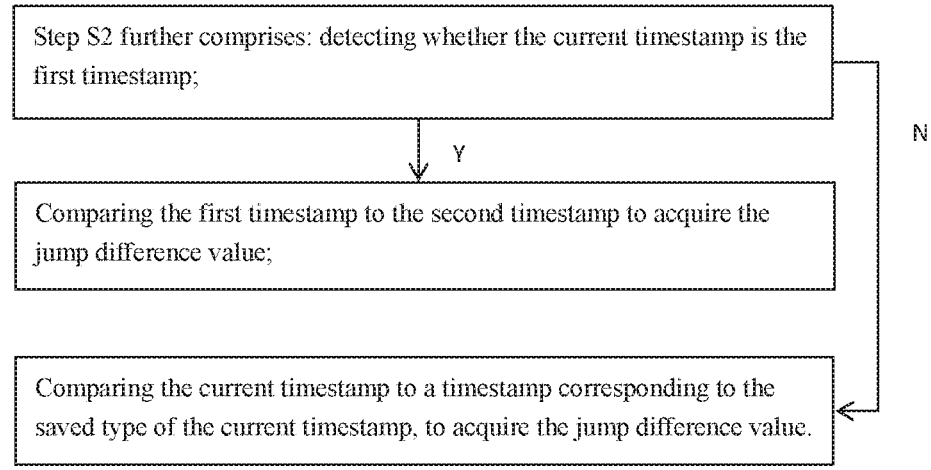
FIG. 2 is a flowchart illustrating a step 2 of a synchronous modulation method based on an embedded player according to an implementation of the present disclosure.

Based on the above-mentioned technical solution, as shown in FIG. 2, Step S2 further comprises:
  detecting whether the current timestamp is the first timestamp;
  if yes, comparing the first timestamp to the second timestamp to acquire the jump difference value;
  if no, comparing the current timestamp to a timestamp corresponding to the saved type of the current timestamp, to acquire the jump difference value.

In the above-mentioned technical solution, when the current timestamp is the first timestamp, compare the first timestamp to the second timestamp to acquire the jump difference value. From Step S3, it can be known that when the current timestamp is the first timestamp, it means that the timestamp jump difference value is within an acceptable range, so the first timestamp needs to be compared to the second timestamp only.

If the current timestamp is not the first timestamp, it means that the current timestamp is the second timestamp. From Step S4, it can be known that when the current timestamp is the second timestamp, it means that dramatic timestamp hop occurred, so the second timestamp needs to be compared to the current timestamp obtained in the previous synchronous modulation.

Figure 3:
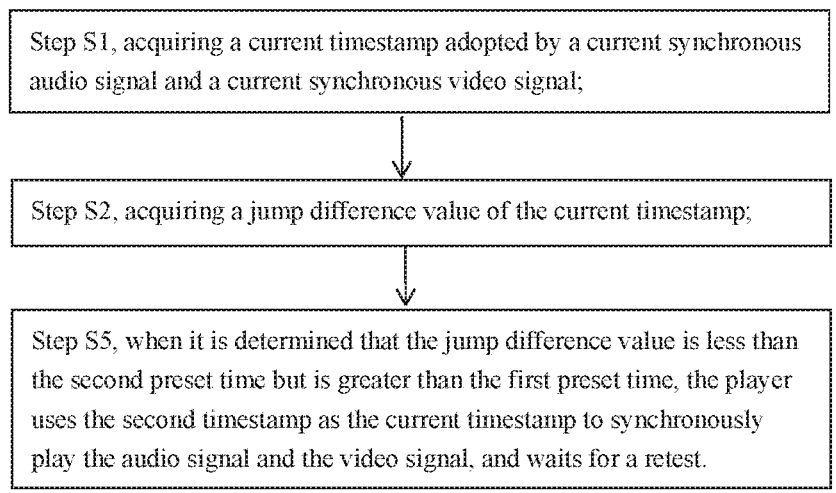
FIG. 3 is a flowchart illustrating steps of a synchronous modulation method based on an embedded player according to an implementation of the present disclosure.

Based on the above-mentioned technical solution, as shown in FIG. 3, the synchronous modulation method further comprises:
  Step S5, when it is determined that the jump difference value is less than the second preset time but is greater than the first preset time, the player uses the second timestamp as the current timestamp to synchronously play the audio signal and the video signal, and waits for a retest.

In the above-mentioned technical solution, when the jump difference value of the current timestamp is less than the second preset time but is greater than the first preset time, it means that the current timestamp has jumped, but is still in a recoverable state. Accordingly, corresponding time is set aside for its recovery. When the current timestamp changes, the previous type of current timestamp in a synchronization mode is not required to be saved; when the jump difference value is less than the second preset time but is greater than the first preset time, a video timestamp acts as a synchronization reference, and audio and video synchronization is not performed.

Figure 4:
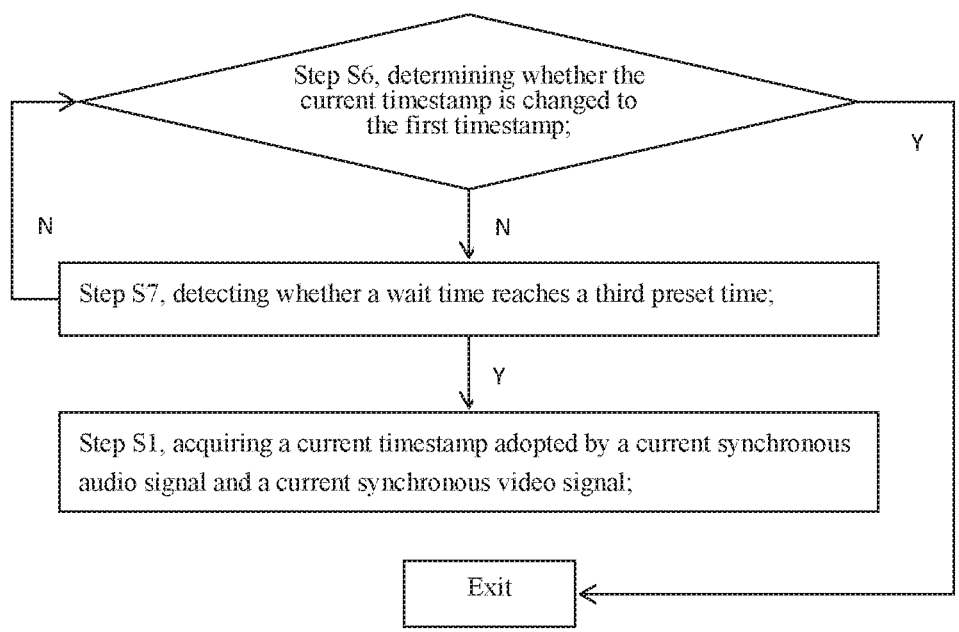
FIG. 4 is a flowchart illustrating steps of a synchronous modulation method based on an embedded player according to a further implementation of the present disclosure.

Furthermore, as shown in FIG. 4, the method further comprises:

Step S6, determining whether the current timestamp is changed to the first timestamp;
if no, then executing Step S7;
if yes, then exiting;
Step S7, detecting whether a wait time reaches a third preset time;
if yes, then returning to Step S1;
if no, then returning to Step S6.

In the above-mentioned technical solution, when Step S5 is in a wait state, another process may restart the synchronous modulation process. In Step S6, determining whether a synchronous modulation performed by another process changes the current timestamp. That is, determining whether the current timestamp is changed from the second timestamp to the first timestamp, if yes, it can be known from Step S3 that when the current timestamp is changed to the first timestamp, the timestamp jump difference value of the current timestamp is within an acceptable range, that is, the timestamp is recovered successfully, so that it is allowed to exit the synchronous modulation process; if no, it means that the timestamp is not recovered successfully, keep waiting and monitoring whether the current timestamp changes. When the wait time reaches the third preset time, it means that the timestamp jump fails to recover, then executing Step S1, and starting to perform a new round of synchronous modulation.

Wherein, the third preset time is in a range of 10 s to 30 s. As a preferred implementation, the third preset time may be 10 s, 12 s, 14 s, 16 s, 18 s, 20 s, 22 s, 24 s, 26 s, 28 s, or 30 s.

In the above-mentioned technical solution, the first timestamp and the second timestamp are set to correspond to two key elements when the video is playing. The appearance of the two timestamps may represent different historical situation through the process control, so that the system may execute a corresponding judgment process according to the current timestamp. After the timestamp of the player jumps, the video continues playing as expected, and the audio and video may play synchronously; then video jamming, fast forward and slow forward may be further avoided; in particular for live streaming, the normal playback of the live streaming is not affected; the fault tolerance of the player is further improved, the user experience is improved, and the player is adapted to different types of streaming media servers.

The above descriptions are only the preferred implementations of the disclosure, not thus limiting the implementations and scope of the disclosure. Those skilled in the art should be able to realize that the schemes obtained from the content of specification and drawings of the disclosure are within the scope of the disclosure. The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A synchronous modulation method based on an embedded player, the method comprising:
   Step S1, acquiring a current timestamp adopted by a current synchronous audio signal and a current synchronous video signal;
   Step S2, acquiring a jump difference value of the current timestamp;
   Step S3, determining whether the jump difference value is less than a first preset time, and in response to the jump difference value being less than the first preset time, synchronously playing, by the player, the audio signal and the video signal through a first timestamp, and exiting; and
   Step S4, determining whether the jump difference value is greater than a second preset time, and in response to the jump difference being greater than the second preset time, synchronously playing, by the player, the audio signal and the video signal through a second timestamp, and exiting;
   wherein
      the first timestamp is an audio timestamp corresponding to the audio signal;
      the second timestamp is a video timestamp corresponding to the video signal;
      in Step S3, a type of the current timestamp is saved before exiting; and
      in Step S4, a type of the current timestamp is saved before exiting;
      wherein Step S2 further comprises:
         detecting whether the current timestamp is the first timestamp;
            if yes, comparing the first timestamp to the second timestamp to acquire the jump difference value;
            if no, comparing the current timestamp to a timestamp corresponding to the saved type of the current timestamp, to acquire the jump difference value.

2. The synchronous modulation method based on an embedded player according to claim 1 further comprising:
   Step S5, when it is determined that the jump difference value is less than the second preset time but is greater than the first preset time, the player uses the second timestamp as the current timestamp to synchronously play the audio signal and the video signal, and waits for a retest.

3. The synchronous modulation method based on an embedded player according to claim 2, further comprising:
   Step S6, determining whether the current timestamp is changed to the first timestamp;
   if no, then executing Step S7;
   if yes, then exiting;
   Step S7, detecting whether a wait time reaches a third preset time;
   if yes, then returning to Step S1;
   if no, then returning to Step S6.

4. The synchronous modulation method based on an embedded player according to claim 3, wherein in Step S6, the synchronous modulation method performed by another process changes the current timestamp.

5. The synchronous modulation method based on an embedded player according to claim 1, wherein the first preset time is in a range of 2s to 7s.

6. The synchronous modulation method based on an embedded player according to claim 1, wherein the second preset time is in a range of 40s to 80s.

7. The synchronous modulation method based on an embedded player according to claim 3, wherein the third preset time is in a range of 10s to 30s.

8. A synchronous modulation method for use with an embedded audio and video player, the method comprising:
   determining a current timestamp associated with a current synchronous audio signal and a current synchronous video signal;
   determining a jump difference value of the current timestamp;
   determining whether the jump difference value is less than a first preset time, in response to the jump difference value being less than a first present time, synchronously playing, by the embedded audio and video player, the audio signal and the video signal through a first timestamp, and exiting; and
   determining whether the jump difference value is greater than a second preset time, and in response to the jump difference being greater than a second present time, synchronously playing, by the embedded audio and video player, the audio signal and the video signal through a second timestamp, and exiting;
   wherein the first timestamp is an audio timestamp corresponding to the audio signal, and the second timestamp is a video timestamp corresponding to the video signal;
   in the step of determining whether the jump difference value is less than a first preset time, a type of the current timestamp is saved before exiting; and
   in the step of determining whether the jump difference value is greater than a second preset time, a type of the current timestamp is saved before exiting;
   wherein determining a jump difference value of the current timestamp further comprises:
      detecting whether the current timestamp is the first timestamp;
      in response to the current timestamp being the first time stamp, comparing the first timestamp to the second timestamp to acquire the jump difference value, and in response to the current timestamp not being the first time stamp, comparing the current timestamp to a timestamp corresponding to the saved type of the current timestamp, to acquire the jump difference value.

9. The synchronous modulation method of claim 8, wherein the first preset time is in a range of 2 seconds to 7 seconds.

10. The synchronous modulation method of claim 8, wherein the second preset time is in a range of 40 seconds to 80 seconds.

11. The synchronous modulation method of claim 8, further comprising:
   after determining whether the jump difference value is greater than a second preset time, determining whether the jump difference value is less than the second preset time but is greater than the first preset time, and in response to the determining whether the jump difference value is less than the second preset time but is greater than the first preset time, the embedded audio and video player uses the second timestamp as the current timestamp to synchronously play the audio signal and the video signal, and waits for a retest.

12. The synchronous modulation method of claim 11, further comprising after determining whether the jump difference value is less than the second preset time but is greater than the first preset time, determining whether the current timestamp is changed to the first timestamp, and in response to determining the current timestamp is changed to the first time stamp, exiting, and in response to determining the current time stamp is not changed to the first time stamp, then detecting whether a wait time reaches a third preset time, and in response to detecting that the wait time has reached a third present time, returning to the initial step of determining a current timestamp associated with a current synchronous audio signal and a current synchronous video signal, and otherwise returning to determining whether the current timestamp is changed to the first timestamp.

13. The synchronous modulation method of claim 12, wherein in determining whether the current timestamp is changed to the first timestamp, the synchronous modulation method performed by another process changes the current timestamp.

14. The synchronous modulation method based on an embedded player according to claim 12, wherein the third preset time is in a range of 10 seconds to 30 seconds.

* * * * *